(12) United States Patent
Wang et al.

(10) Patent No.: US 7,319,584 B2
(45) Date of Patent: Jan. 15, 2008

(54) CASING FOR NOTEBOOK COMPUTER

(75) Inventors: Beniz Wang, Taipei (TW); Miriam Cheng, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/256,420

(22) Filed: Oct. 20, 2005

(65) Prior Publication Data

US 2007/0091558 A1    Apr. 26, 2007

(51) Int. Cl.
*G06F 1/16* (2006.01)
(52) U.S. Cl. .................................. 361/683; 312/223.1
(58) Field of Classification Search ............... D14/315, D14/439–441; 361/683
See application file for complete search history.

(56) References Cited

U.S. PATENT DOCUMENTS

| | | | | |
|---|---|---|---|---|
| 3,527,373 | A * | 9/1970 | Giraudet et al. | 220/345.1 |
| 5,423,605 | A * | 6/1995 | Liu | 312/265.6 |
| 5,785,398 | A * | 7/1998 | Park | 312/223.2 |
| 5,878,608 | A * | 3/1999 | Alyanakian | 70/208 |
| 6,028,765 | A * | 2/2000 | Swindler et al. | 361/683 |
| 6,216,988 | B1 * | 4/2001 | Hsu et al. | 248/118 |
| 6,400,562 | B1 * | 6/2002 | Lee et al. | 361/683 |
| 6,660,427 | B1 * | 12/2003 | Hukill et al. | 429/97 |
| 6,935,661 | B1 * | 8/2005 | Farnsworth et al. | 292/162 |
| 6,976,868 | B2 * | 12/2005 | Hsu et al. | 439/491 |
| 2002/0085342 | A1 * | 7/2002 | Chen et al. | 361/683 |
| 2005/0187784 | A1 * | 8/2005 | Bander et al. | 705/1 |
| 2006/0268499 | A1 * | 11/2006 | Chan et al. | 361/683 |
| 2007/0076361 | A1 * | 4/2007 | Yin | 361/683 |

FOREIGN PATENT DOCUMENTS

JP        2000-114738      *  4/2000

* cited by examiner

*Primary Examiner*—Jayprakash Gandhi
*Assistant Examiner*—Anthony Q Edwards
(74) *Attorney, Agent, or Firm*—Raymond J. Ho; Venable LLP

(57) ABSTRACT

A device and method is provided for providing a notebook computer casing whose contour and outward features can be change by the user. The device includes a main body, at least one decorative piece that can be fixed on and detached from the main body at random. The main body includes a slot, set on its rims, and a first locking part, set inside the slot, at least one decorative piece that includes a first interlocking part can be locked into position with the first locking part. The decorative pieces are to be fixed on the main body to change the contour and outward features of the computer and, meanwhile, serve as buffers protecting the computer against impact damage.

8 Claims, 5 Drawing Sheets

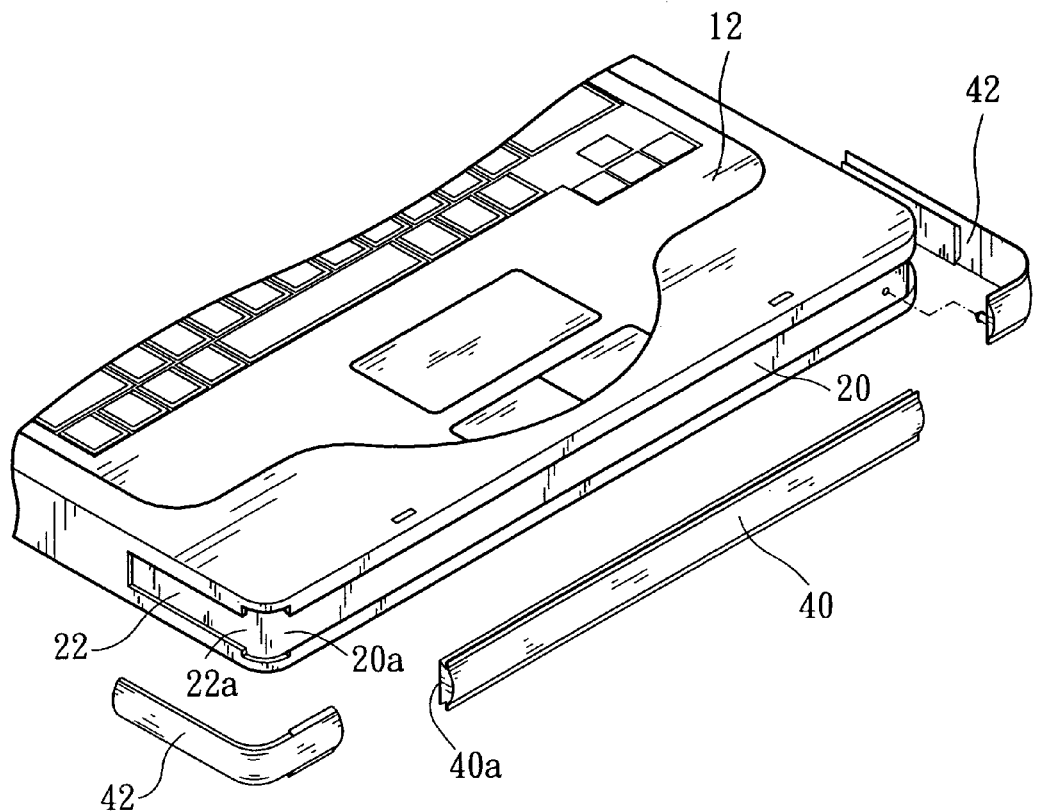
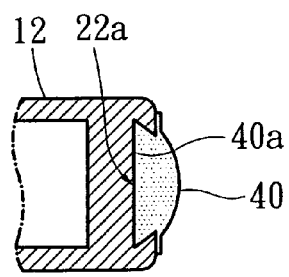
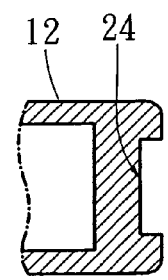
FIG.3
FIG.4
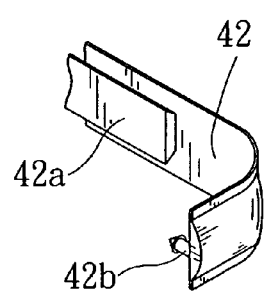
FIG.5

CASING FOR NOTEBOOK COMPUTER

BACKGROUND OF THE INVENTION

1. Field of the Invention

The present invention relates to a casing for use with notebook computers, particularly one whose contour and outward features can be changed by the user.

2. Description of the Related Art

Most manufacturers of notebook computer casings often have patterns, marks, etc. embossed or engraved on their casings to differentiate them from other makes and make them more visually appealing.

But no matter how fancy a casing's outward design may be, the pleasure of looking at a fancy new design soon palls as it becomes familiar day by day. Furthermore, the uniform nature of factory-made casings does not allow a user to differentiate his computer from others of the same model.

Some owners use stickers to differentiate, decorate, or personalize their own computers. But the stickers soon lose its luster and attraction, and even become an annoyance when they wear out, leaving the residual glue on the surface of the casing.

SUMMARY OF THE INVENTION

In consideration of the above situation, the present invention aims to provide the user with a notebook computer casing whose contour and outward features can be changed any time anywhere.

Also, the present invention aims to provide the user with a notebook computer casing whose outward decoration parts can be changed/replaced easily.

Still another aim of the present invention is to provide the user with a notebook computer casing whose outward decoration parts may serves as buffers protecting the computer against impact damage.

To achieve the above aim, the casing of the present invention comprises a main body and at least one decorative piece that can be fixed on or detached from the main body at random. The main body has an indented slot on its rims, with a first locking part set on the inner walls of the slot. The decorative piece comprises a second locking part that can be locked into position with the first locking part. Also, the two locking parts, when interlocked, stay within the slots, with the outer rim of the decorative piece protruding out of the slot of the casing main body. By the above design, the user will be able to change the contour and the outward features of his notebook computer without using any tools and protect it against unexpected impact.

To let the examiners better understand the invention, we will give detailed descriptions, illustrated with drawings, of a few preferred embodiment of the present invention.

BRIEF DESCRIPTION OF THE DRAWINGS

FIG. 2 is the exploded view of a first preferred embodiment of the present invention;

FIG. 3 shows the cross-sectional view of the first decorative piece used in a first preferred embodiment of the present invention;

FIG. 4 shows the cross-sectional view of the locking slot designed in a first preferred embodiment of the present invention;

FIG. 5 shows the enlarged view of the second decorative piece used in a first preferred embodiment of the present invention;

DESCRIPTION OF THE PREFERRED EMBODIMENTS

Figure 1:
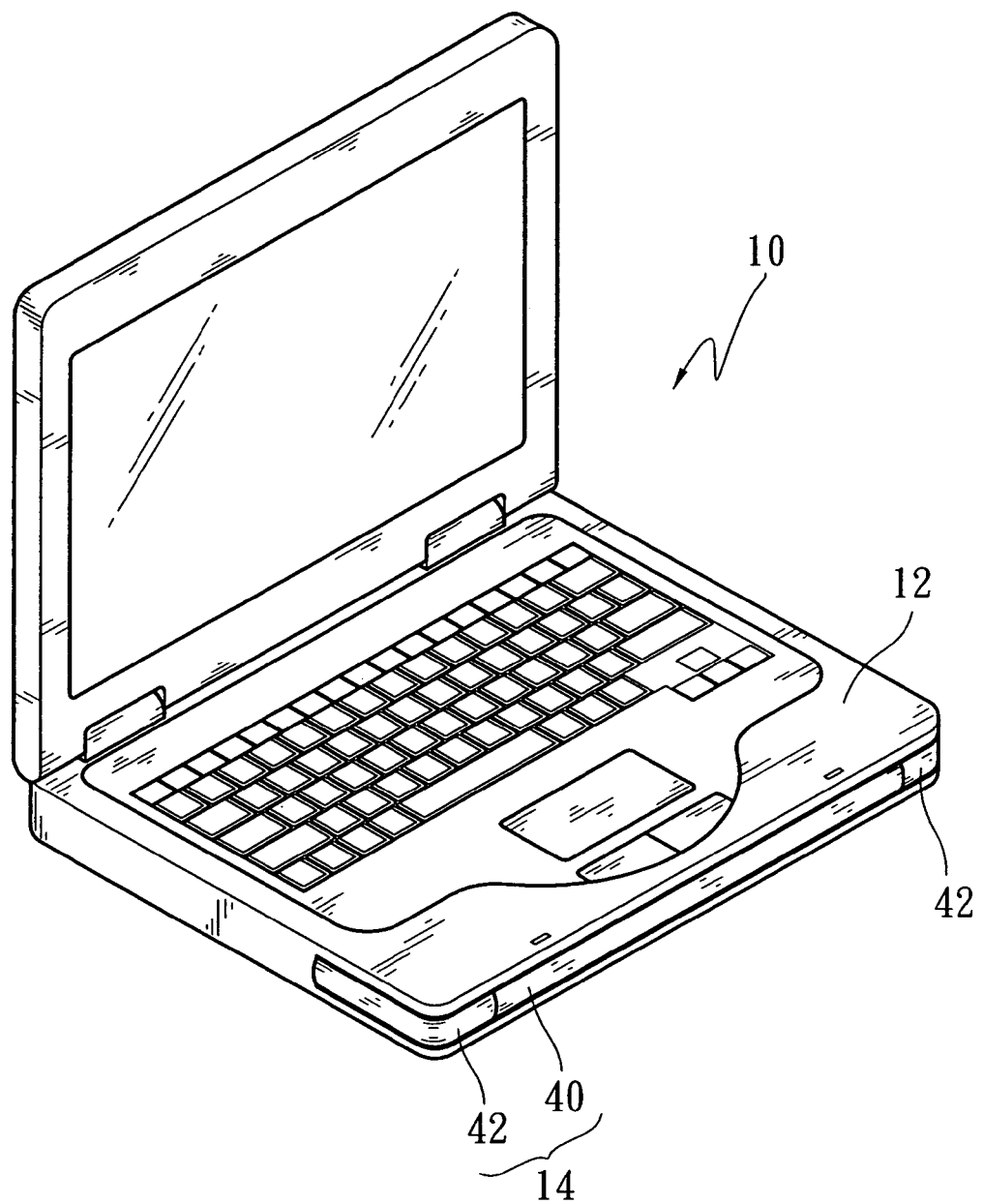
FIG. 1 shows the three dimensional view of a first preferred embodiment of the present invention.

Please refer to FIG. 1. The notebook computer 10 as disclosed in the present invention consists of two major parts: 1. the main body 12 on which the display screen and other electronic components such as the keyboards are installed; and 2. the decorative piece 14 that can be fixed on and detached from the main body 12.

Now, please refer to FIG. 1 to FIG. 5. The main body 12 is a square object with a certain suitable thickness. On the front rim of the main body there is the first slot 20, inside which the first locking part 20a is set, which is a dove-tail shaped slot extending along the lateral direction of the first slot 20. Also, a pair of second slot 22 is set on the two side rims of the main body. Inside each of the two second slots a second locking part 22a is set, which is also a dove-tail shaped slot extending along the lateral direction of the second slot 22. A pair of connecting slots 24 is made on the two outer corners of the main body 12 each positioned between the first slot 20 and a second slot 22 and with the cross section shaped like a rectangle.

Please then refer to FIG. 1 to FIG. 5. The decorative piece 14 comprises a first decorative piece 40 and two second decorative pieces 42. The first decorative piece 40 is of a pre-determined length, with its two rims curved outwards and the inside shaped like a dove-tail slot forming the first interlocking part 40a which can be interlocked with the first locking part 20a. The second decorative piece 42 is roughly L-shaped, with its two rims also curved outwards. On the inner side of the second decorative piece 42, it forms a dovetail shaped second interlocking part 42a facing the main body's 12 side rims and a decorative piece locking part 42b, which is a protruding column with one end shaped like a hook, facing the main body's 12 front rim.

Again, please refer to FIG. 1 to FIG. 5. When assembling, the user first push the first decorative piece 40 from one end of the connecting slot 24 into the first slot 20, with the inner side of the first decorative piece 40 covering the whole area of the first slot 20, and the first interlocking part 40a is completely locked with the first locking part 20a; he then pushes the two second decorative pieces 42, from both end of the main body's 12 front rim, into their corresponding second slots 22, causing each second interlocking part 42a be firmly locked with each second locking part 22a, and each second decorative piece 42 completely covers each second slot 22. Thus the locking parts 42b of the decorative pieces are firmly locked with the connecting slots 24 of the main body 12, enabling the first decorative pieces 40 be firmly locked in position.

Figures 6A, 6B:
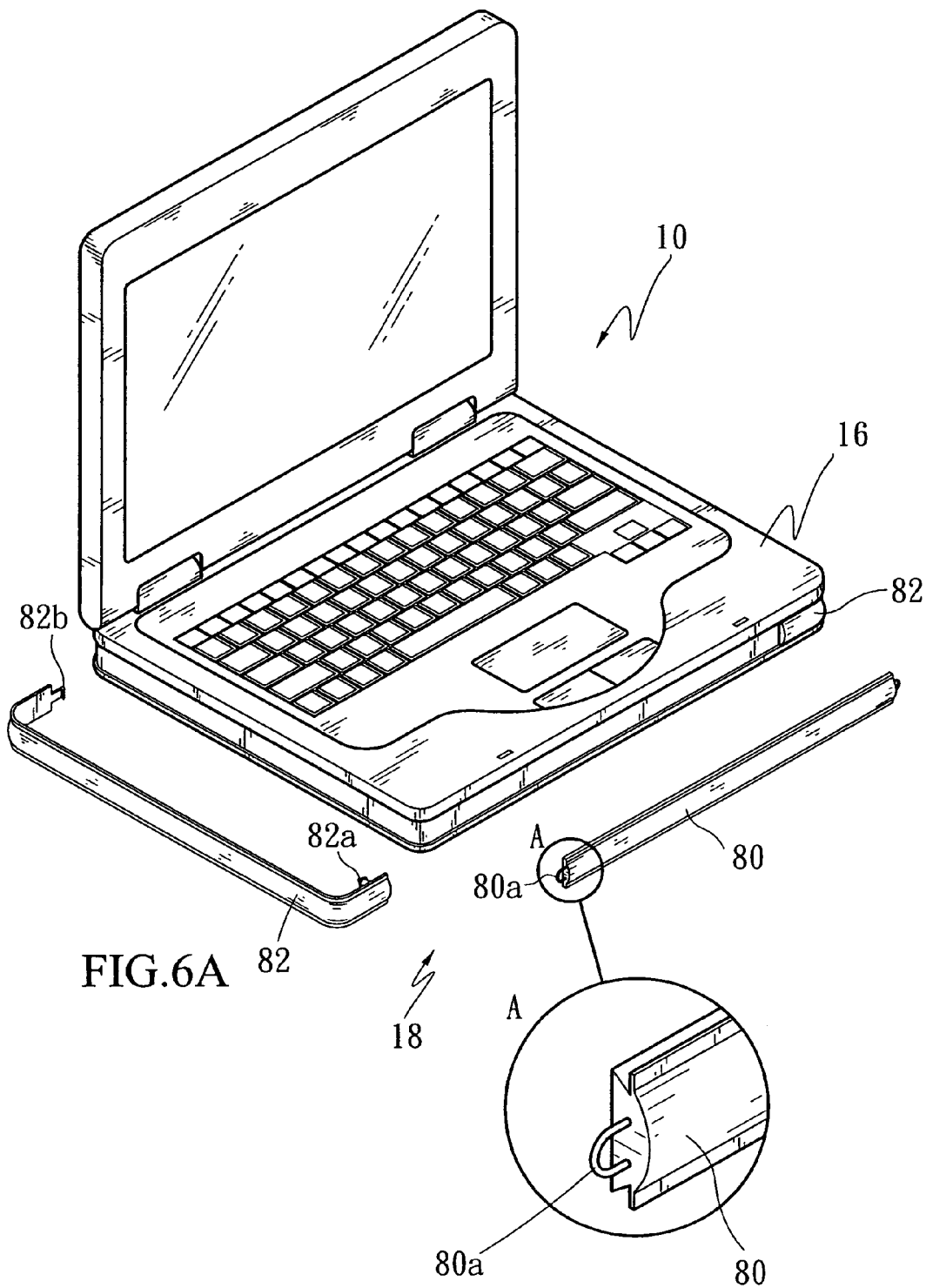
FIG. 6A shows the exploded view of a second preferred embodiment of the present invention.
FIG. 6B shows the enlarged view of the A as illustrated in FIG. 6A.
Figure 7:
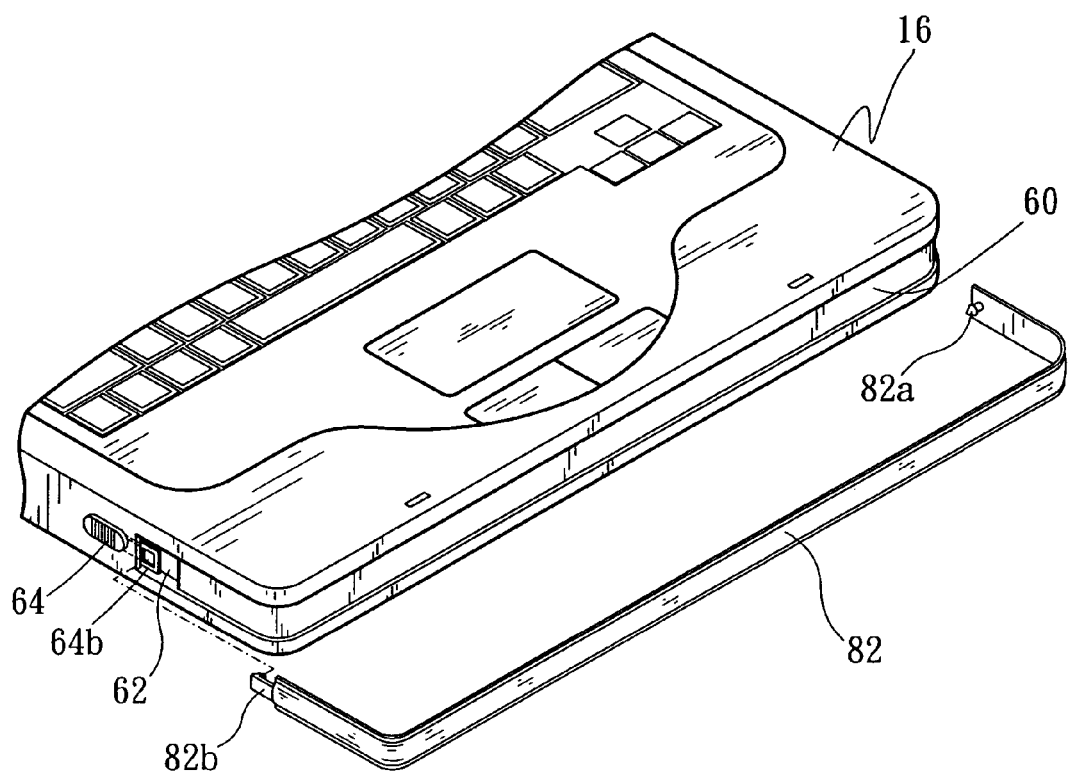
FIG. 7 shows the enlarged view of a second preferred embodiment of the present invention.

Please then refer to FIG. 6A, which shows another way the decorative pieces 18 are fixed on the main body 16 of the notebook computer 10.

Please refer to FIG. 6A to FIG. 10. On the main body 16, there is a first slot 60 that surrounds the four sides of the main body 16. A pair of second slots 62 is set on the two sides of back side of the main body 16. A pair of sliding locks 64, pushed by springs 64a, can be moved between the left first position and the right second position and are each set inside their corresponding second slots 62. On each of the sliding locks 64 there is a ring-shaped main body locking part 64b.

Please refer to FIG. 6A to FIG. 10. The decorative pieces 18 comprise a first decorative piece 80 and two second decorative pieces 82. The first decorative piece 80 is of a predetermined length, with a ring-shaped first locking part 80a on each end. The second decorative piece 82 is roughly U-shaped, and, when fixed on the main body 16, extends along the front, side, and back rims of the main body 16. Inside the end of its section facing the front rim of the main body 16, there is a column shaped second interlocking part 82a. And on the inner side of its section facing the back rim of the main body 16, there is a decorative piece locking part 82b, which is shaped like a protruding column with a hooked bottom end.

Figure 8:
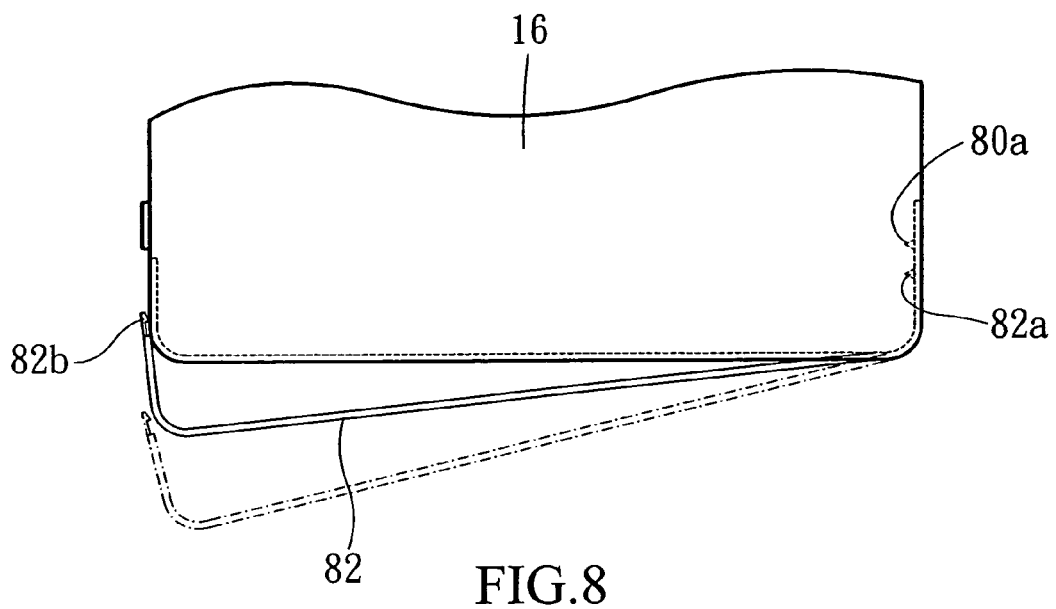
FIG. 8 shows the top view of the second preferred embodiment of the present invention.
Figure 9:
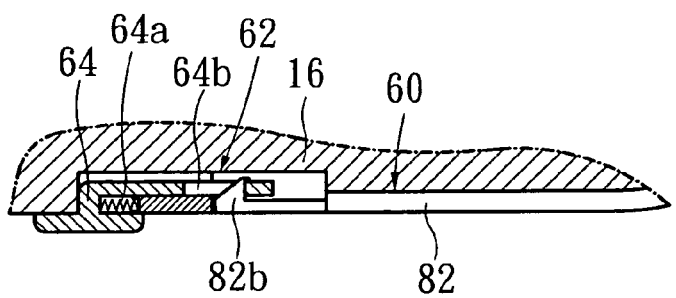
FIG. 9 shows the cross-sectional view of the sliding lock mechanism, in its left first position, used in the second preferred embodiment of the present invention.

Again, please refer to FIG. 6A to FIG. 10. When assembling, the user fist pushes the first decorative piece 80 into the first slot 60, at the position facing the front rim of the main body 16. Then the user pushes the two second interlocking parts 82a on each of the second decorative piece 82 into their corresponding second interlocking part 82a. Then, using each of the second interlocking part 82a as a pivot and swiveling the second decorative piece 82, as illustrated in FIG. 8, position each of the decorative piece locking part 82b to its corresponding second slot 62, holding the edge of the main body locking part 64b at the left first position by its hook, and remaining fixed by the tension of the springs 64a.

Figure 10:
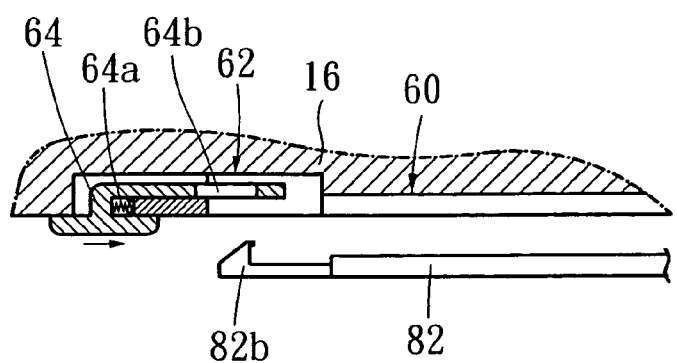
FIG. 10 shows the cross-sectional view of the sliding lock mechanism, in its right second position, used in the second preferred embodiment of the present invention.

Again, please refer to FIG. 6A to FIG. 10. When the user wants to change the decorative pieces 18, he can pushes the sliding locks 64 toward the right second position, as illustrated in FIG. 10, pressing the springs 64a to release the main body locking part's 64b edge from the end of the decorative piece locking part 82b. Thus, the second decorative piece 82 can be detached from the main body 16, keeping both ends of the first decorative piece 80 free that the user can pry them up with fingers easily.

Again, please refer to FIG. 6A to FIG. 10. Although in the embodiment described above, there is just a first slot 60 surrounding the main body's 16 rims, in practice, the width of the first slot 60 can be extended to the surface or bottom of the main body 16, or, instead, the first slot 60 can be positioned on the surface or bottom of the main body 16. We can even dispense with the design of the first slot 60, and apply on the outer rims of the main body 16 the main body connecting slot 24 and decorative piece locking part 42b etc., shown in FIG. 2 and FIG. 5. All of them can achieve the aims of changing the outward features of the notebook computer by easy-to-fix/detach decorative pieces 18 as disclosed by the present invention and thus should be considered as belonging to the same technical means as disclosed by the present invention.

Also, please refer to FIG. 1 to FIG. 6A. The main body 12, 16 as described in the above embodiment of the present invention is the part, of a notebook computer, that hosts the keyboard and can be placed on top of a desk. But in practice the same mechanism can be applied on the part, of a notebook computer, that hosts the screen and can be flipped open.

In summary, the construction of the present invention as disclosed above can let the user change the contour and outward features of a notebook computer without using any tools. Furthermore, as the decorative pieces 14, 18, as shown in FIG. 1 and FIG. 6A, will be available in various colors, patterns and shapes, even with names and personalized logos, the user will be able to differentiate his computers from others of the same make an incentive strong enough to motivate consumers' buying decision.

Although the present invention is disclosed as the preferred embodiment described in the above, the description is by no means meant to limit the scope of the invention's applications. As is understood by a person skilled in the art, the foregoing preferred embodiment of the present invention is an illustration, rather than a limiting description, of the present invention. It is intended to cover various modifications and similar arrangements included within the spirit and scope of the appended claims, the scope of which should be accorded the broadest interpretation so as to encompass all such modifications and similar structures.

What is claimed is:

1. A notebook computer casing, comprising:
    a main body having a certain predetermined shape, thickness, and a sliding lock, wherein said sliding lock can move to and from between a left first position and a right second position, said sliding lock comprising a ring-shaped main body locking part; and
    at least one decorative piece, set on rims of said main body, said decorative pieces having a decorative piece locking part, said decorative piece locking part being a protruding column with a hook shaped end that can be locked into position with said sliding lock.

2. The notebook computer casing as in claim 1, wherein said notebook computer casing further comprises a spring, positioned between said sliding lock and said main body.

3. The notebook computer casing as in claim 1, wherein said decorative pieces further comprise a first decorative piece and a second decorative piece connected to said first decorative piece.

4. The notebook computer casing as in claim 3, wherein said first decorative piece further comprises a first interlocking part and said decorative piece locking part is set on one end of said second decorative piece; said second decorative piece further comprising a second interlocking part, said second interlocking part connected with said first interlocking part.

5. The notebook computer casing as in claim 4, wherein said first interlocking part is set on one end of said first decorative piece and is ring-shaped; and said second interlocking part is set on another end of said second decorative piece and said second interlocking part is a protruding column that locks into said first interlocking part.

6. The notebook computer casing as in claim 1, wherein said main body comprises a first slot inside which is to be set said decorative piece.

7. The notebook computer casing as in claim 6, wherein said main body comprises a first slot inside which is to be set said first decorative piece.

8. The notebook computer casing as in claim 1, wherein said main body comprises a second slot inside which is to be set said sliding lock.

* * * * *